US007401079B2

(12) United States Patent
Itoh et al.

(10) Patent No.: US 7,401,079 B2
(45) Date of Patent: Jul. 15, 2008

(54) SYSTEM AND METHOD FOR TRANSCODING DIGITAL CONTENT

(75) Inventors: Takashi Itoh, Machida (JP); Hironobu Takagi, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 1017 days.

(21) Appl. No.: 10/233,093

(22) Filed: Aug. 29, 2002

(65) Prior Publication Data

US 2003/0065645 A1 Apr. 3, 2003

(30) Foreign Application Priority Data

Aug. 29, 2001 (JP) ............................. 2001-259846

(51) Int. Cl.
*G06F 17/00* (2006.01)

(52) U.S. Cl. ........................ 707/7; 707/104.1; 715/230; 715/243

(58) Field of Classification Search ............... 707/1-10, 707/100-104.1, 200-206; 715/731, 513, 715/517, 526, 230, 234, 243, 249; 709/217-219, 709/246
See application file for complete search history.

(56) References Cited

U.S. PATENT DOCUMENTS 6,282,548 B1 * 8/2001 Burner et al. ............ 707/104.1
6,999,963 B1 * 2/2006 McConnell ................. 707/100
2002/0054090 A1 * 5/2002 Silva et al. .................. 345/747
2002/0111966 A1 * 8/2002 Fukuda et al. .............. 707/513
2002/0122054 A1 * 9/2002 Hind et al. .................. 345/731
2003/0029911 A1 * 2/2003 Kitayama ................... 235/100
2004/0205545 A1 * 10/2004 Bargeron et al. ............ 715/512

OTHER PUBLICATIONS

Masahiro et al., Annotation of Web Content for Transcoding, Jul. 10, 1999, 1-16.*
Masahiro Hori et al., Annotation of Web Content for Transcoding—W3C, Jul. 10, 1999, 1-16.*
Katashi Nagao et al., Semantic Annotation and Transcoding making Web Content More Accessible, 2001, IEEE, 69-81.*
J. Marco Bremer et al., Web Data Indexing Through External Semantic-carrying Annotations, 2001, IEEE, 69-76.*
Ffukuda et al., Common Layout Extraction From Web Pages, IPSJ SIG Note, vol. 2001 No. 52 pp. 7-14 (May 25, 2001).
Annotation-based Digital Content, IPSJ Magazine, vol. 42, No. 7 pp. 668-675.

* cited by examiner

*Primary Examiner*—Jean B Fleurantin
(74) *Attorney, Agent, or Firm*—Ido Tuchman; Anne Dougherty

(57) ABSTRACT

A system and method for transcoding digital content (e.g. web content) by correctly employing one annotation for multiple digital contents. This can efficiently reduce the workloads required for the addition of annotation data during the transcoding process. A transcoding system comprises an annotation database system for storing annotation data to be used for the transcoding of contents, and a transcoder for transcoding the contents based on annotation data stored in the annotation database system. Upon receiving an inquiry from the transcoder, a correlation between elements in the contents and descriptions of the annotation data is checked to select one annotation that can be employed for transcoding the content. The correlation is specifically determined based on XPath information.

4 Claims, 10 Drawing Sheets

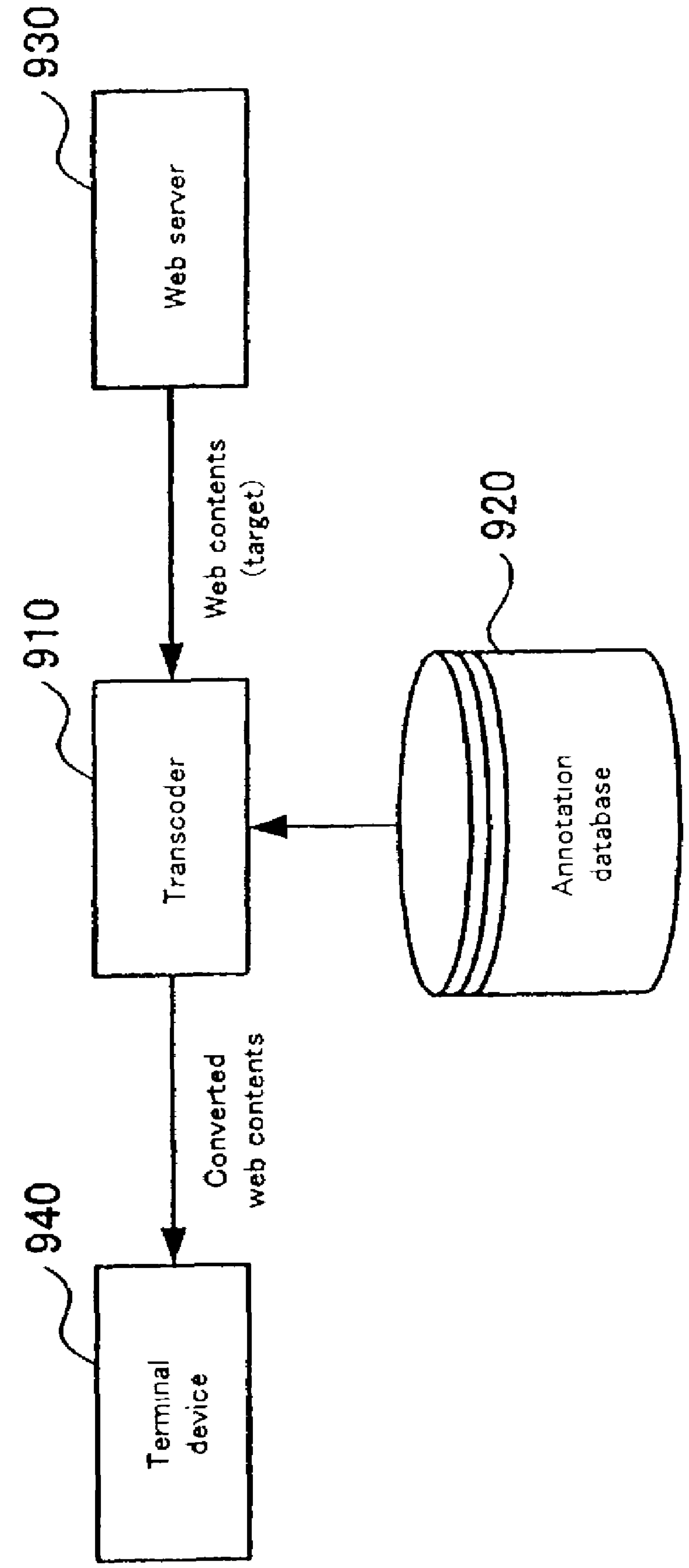
930
Web server
Web contents (target)
910
Transcoder
920
Annotation database
Converted web contents
940
Terminal device

Fig. 4A

```
<description
        accesstype="public"
        optional="true"
        type="group"
xpath="/html[1]/body[1]/table[7]/tbody[1]/tr[1]/td[3]/table[1]/tbody[1]/tr[2]/td[1]">
       <role>advertisement</role>
       <importance>-0.7</importance>
       <title>advertisement</title>
</description>
```

Fig. 4B

```
<description
        accesstype="public"
        optional="true"
        type="group"
        xpath="/html[1]/body[1]/table[8]/tbody[1]/tr[1]/td[2]">
       <role>advertisement</role>
       <importance>-0.7</importance>
       <title>advertisement</title>
</description>
```

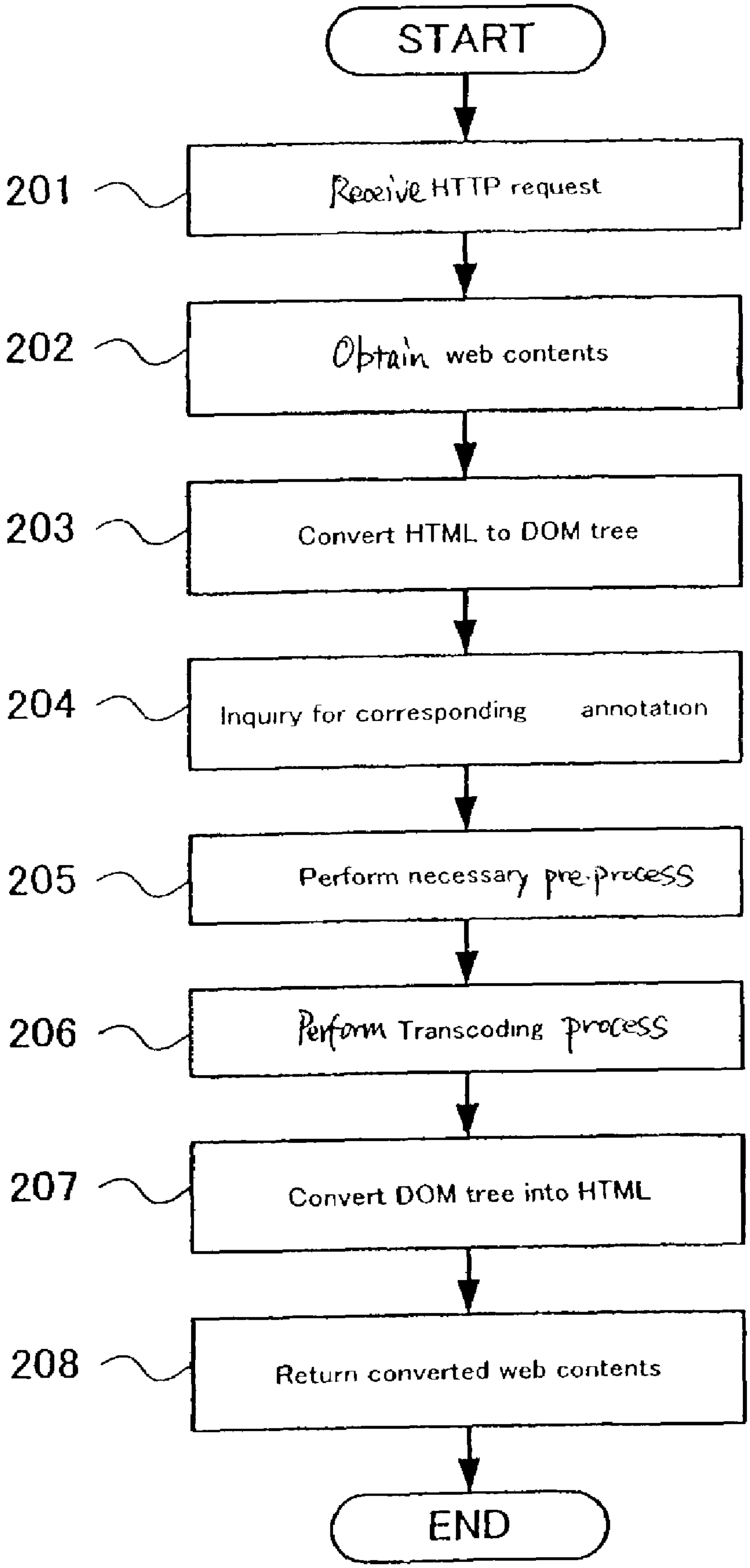
START
201
Receive HTTP request
202
Obtain web contents
203
Convert HTML to DOM tree
204
Inquiry for corresponding annotation
205
Perform necessary pre-process
206
Perform Transcoding process
207
Convert DOM tree into HTML
208
Return converted web contents
END

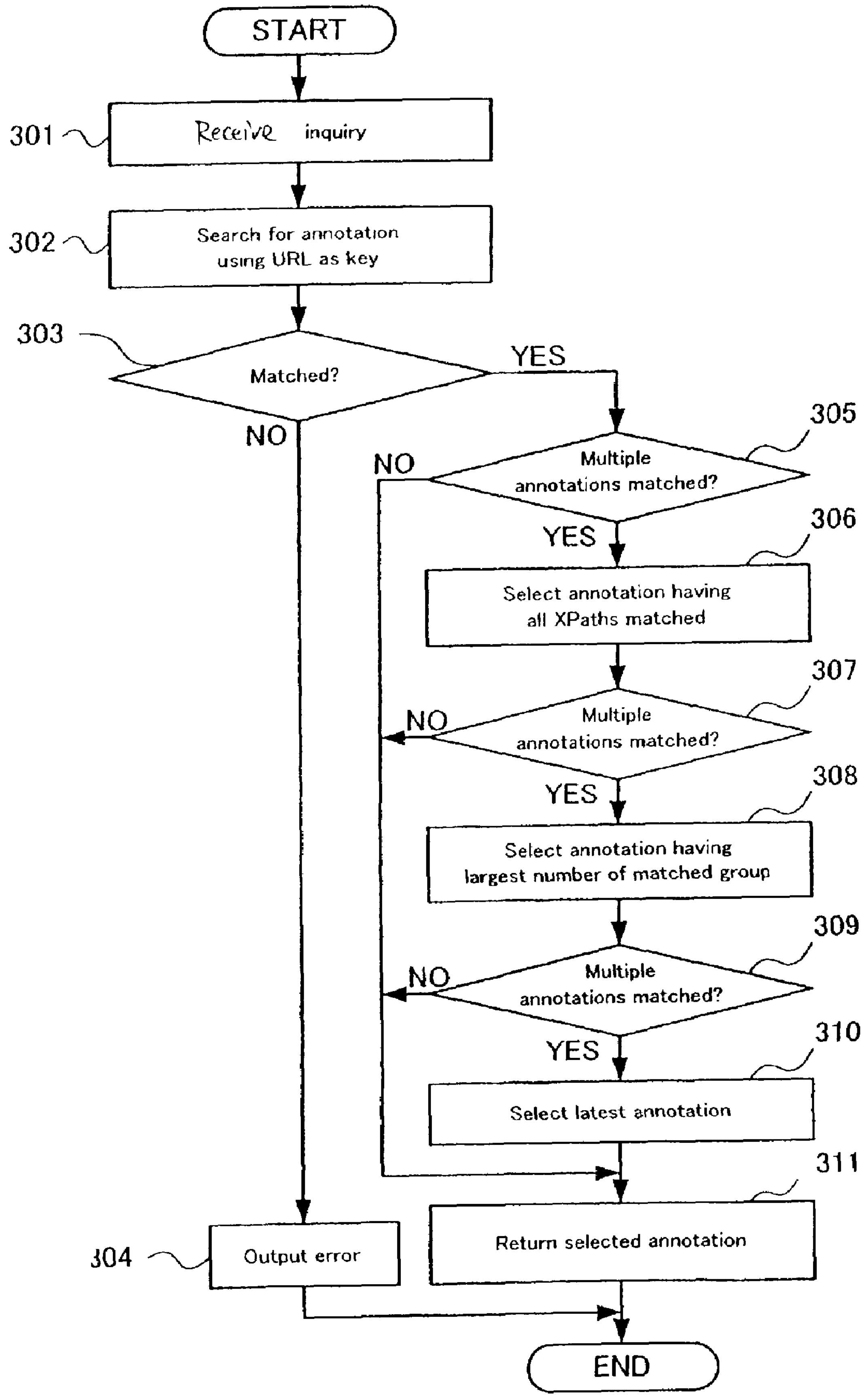
START
301
Receive inquiry
302
Search for annotation using URL as key
303
Matched?
YES
NO
305
Multiple annotations matched?
NO
YES
306
Select annotation having all XPaths matched
307
Multiple annotations matched?
NO
YES
308
Select annotation having largest number of matched group
309
Multiple annotations matched?
NO
YES
310
Select latest annotation
311
Return selected annotation
304
Output error
END

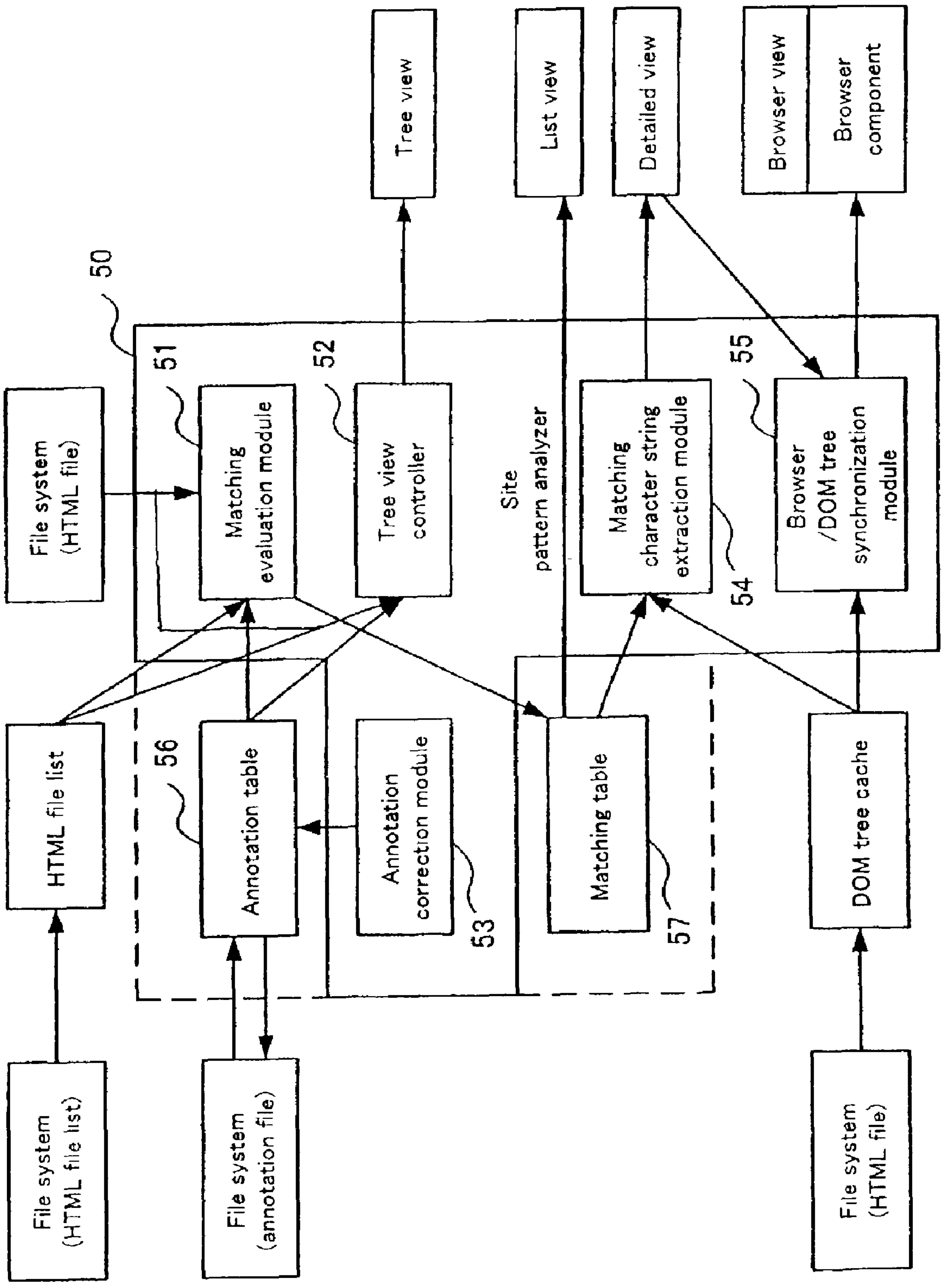
50
Site pattern analyzer
51
Matching evaluation module
52
Tree view controller
53
Annotation correction module
54
Matching character string extraction module
55
Browser /DOM tree synchronization module
56
Annotation table
57
Matching table
Tree view
List view
Detailed view
Browser view
Browser component
File system (HTML file)
HTML file list
File system (HTML file list)
File system (annotation file)
DOM tree cache
File system (HTML file)

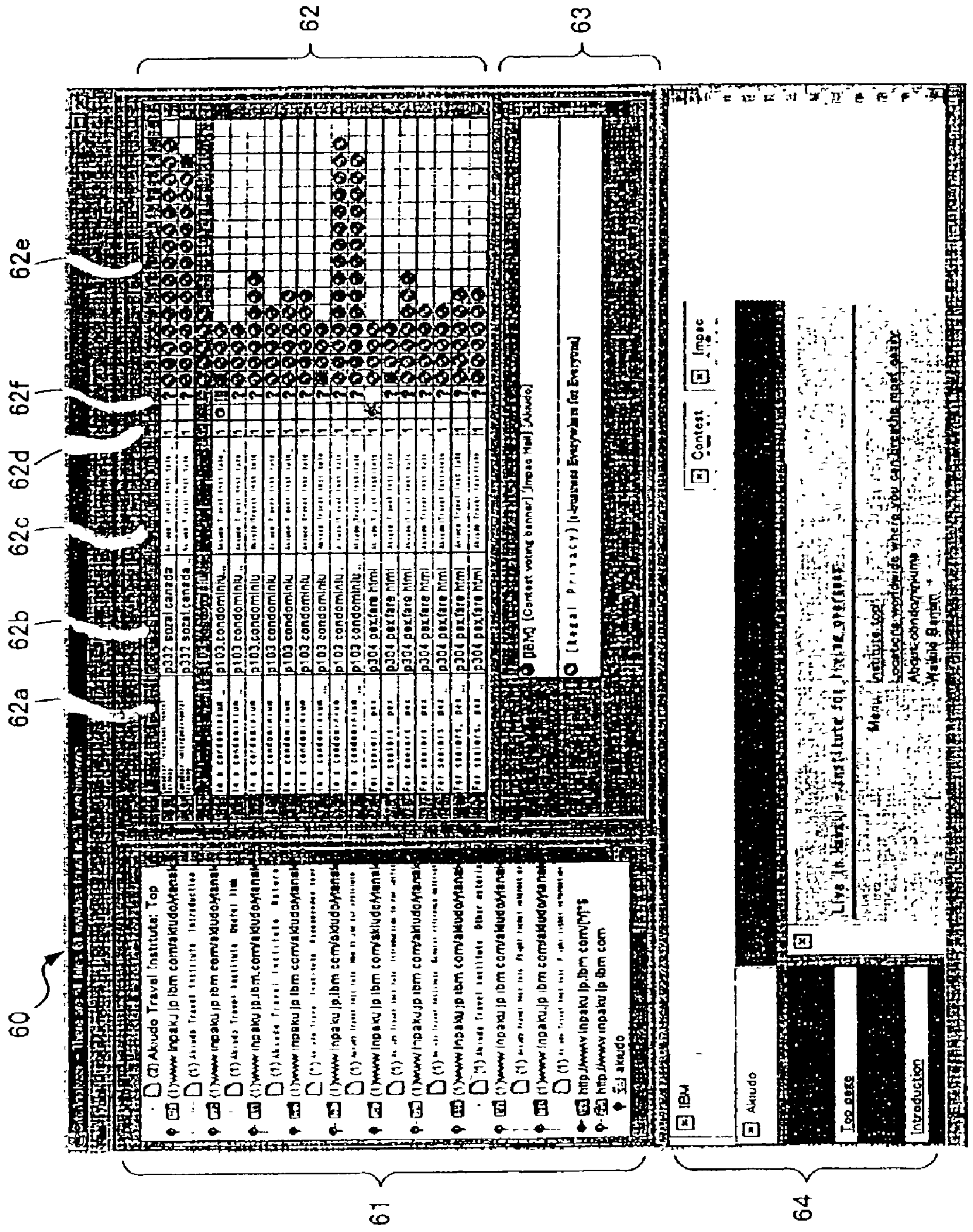
60
61
62
62a
62b
62c
62d
62e
62f
63
64

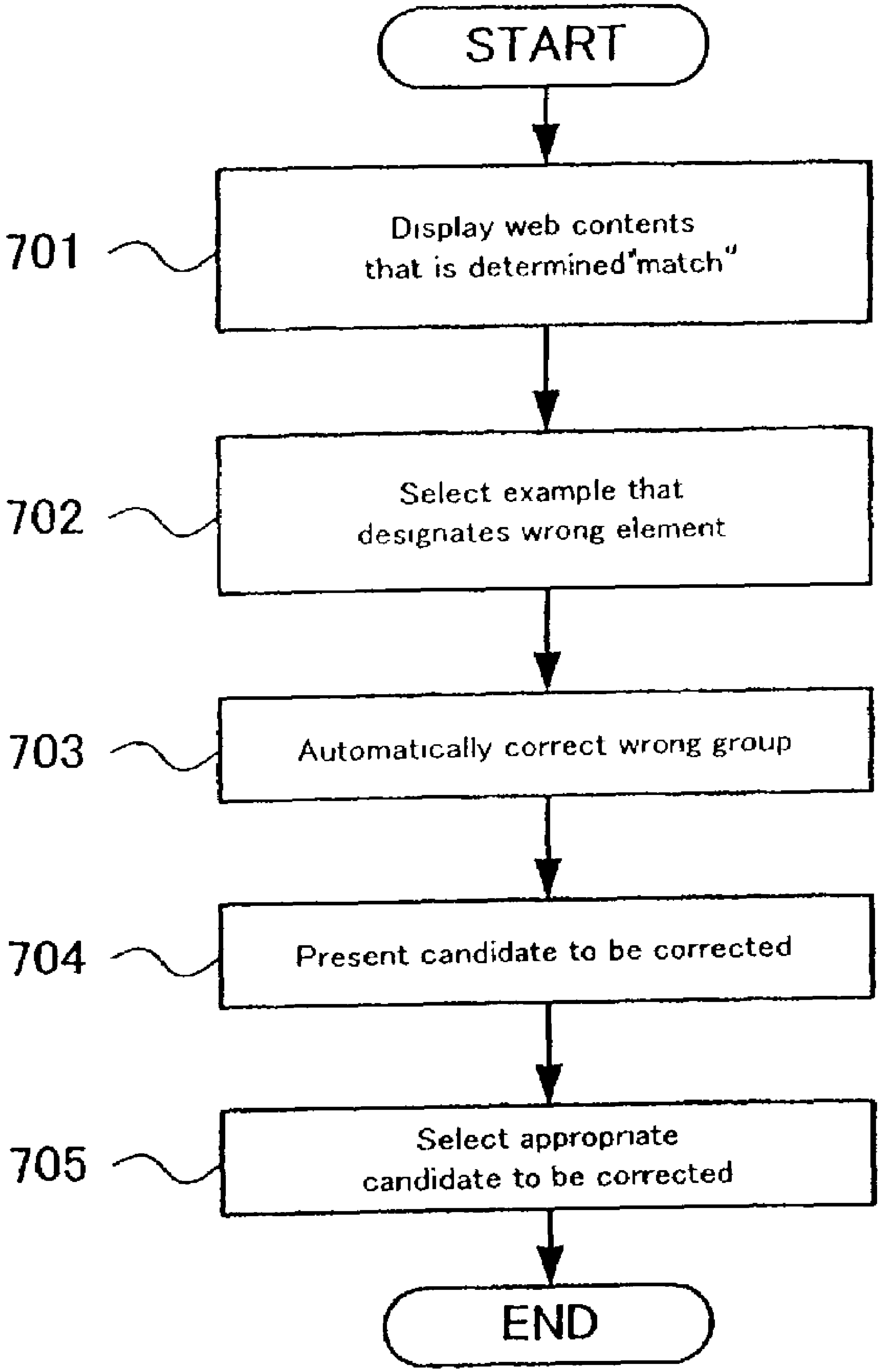
START
701
Display web contents that is determined "match"
702
Select example that designates wrong element
703
Automatically correct wrong group
704
Present candidate to be corrected
705
Select appropriate candidate to be corrected
END

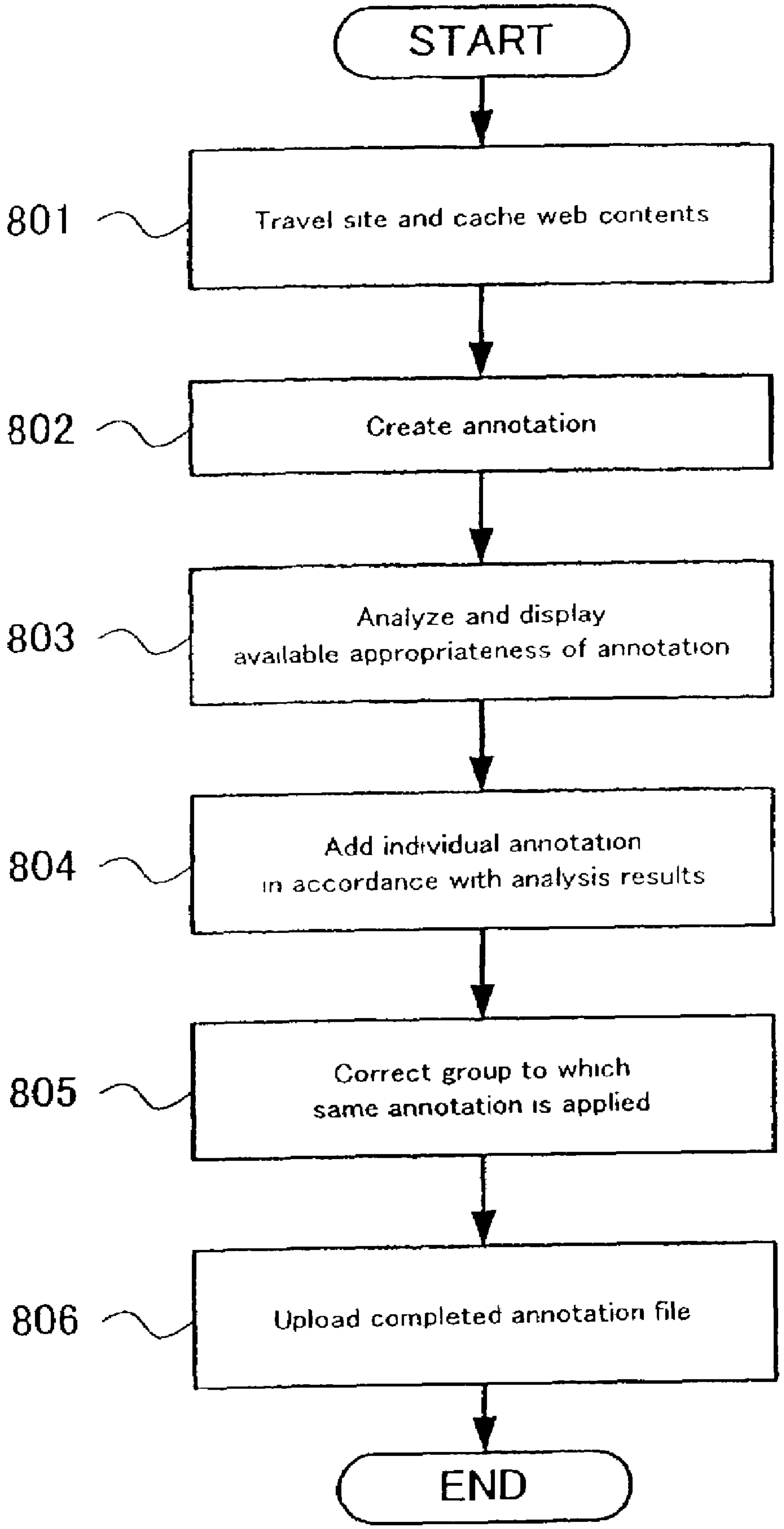
START
801
Travel site and cache web contents
802
Create annotation
803
Analyze and display
available appropriateness of annotation
804
Add individual annotation
in accordance with analysis results
805
Correct group to which
same annotation is applied
806
Upload completed annotation file
END

SYSTEM AND METHOD FOR TRANSCODING DIGITAL CONTENT

BACKGROUND OF THE INVENTION

1. Field of the Invention

The present invention relates to a technique for transcoding information (e.g. digital content, such as a web page) on a network and for distributing the transcoded information, and in particular to a transcoding technique based on an annotation prepared for the information.

2. Description of the Related Art

When access to certain information on a network is requested by a predetermined terminal device, the desired information can be converted, in accordance with specifications of the terminal device or its use environment, to be presented to the terminal device. The conversion technique is called "transcoding" technique. For example, to provide web content on the Internet, the structure of a web page can be adjusted by transcoding, thereby permitting the web content to be fitted into the small display screen of a portable information terminal, or the structure can be altered and adapted for use by a speech browser for voice synthesis.

Roughly speaking, there are two transcoding methods. One is a method for which no additional information is employed. The other is a method using external meta information (annotation). According to the transcoding method for which no additional information is employed, all web contents can be transcoded, regardless of the types and contents of the web data. However, because the types and contents of web data are not taken into account, the transcoding accuracy is low. On the other hand, according to the transcoding method based on annotation data, since an appropriate transcoding method is performed based on annotations that correspond to web contents, the transcoding accuracy is high. However, since much labor and high costs are required to input meta information for annotation, annotation information cannot be added to all web contents, and the number of web contents that can be transcoded is limited. Therefore, in order to transcode more web contents at high accuracy, what is important is how workload for adding an annotation should be reduced.

FIG. 1 is a diagram for explaining the system configuration for performing transcoding based on annotations. In FIG. 1, a transcoding system comprises: a transcoder 910 for converting (transcoding) web content; and an annotation database system 920 in which annotation files used for transcoding is stored. In FIG. 2, when a terminal device 940 issues an access request to a web server 930, the web server 930 returns target web content to be accessed, and the transcoder 910 receives the web content first. The transcoder 910 refers to the annotation database system 920, and transcodes the web content based on data, contained in an annotation file (and hereinafter referred to simply as an annotation), that corresponds to the web content. Thereafter, the obtained web content is transmitted by the transcoder 910 to the terminal device 940.

As a countermeasure for reducing the workload required by the thus arranged system to add an annotation for the transcoding process, it is important that an annotation authoring tool be prepared. Further, one annotation may also be employed for different web contents having the same layout. The conventional methods for correlating one annotation with multiple web contents can be sorted into three types.

1. The correlation between URLs (Uniform Resource Locators) and annotations is stored as table data (correlation table data).
2. A regular expression of URL is employed.
3. An annotation to be employed is dynamically determined by using a table structure of the web content (an automatic determination).

As is described above, when conversion using the transcoding technique is performed to provide information on a network, the transcoding method based on annotations is employed in order to attain high transcoding accuracy. However, since many workloads and high costs are required for the input of meta information for annotations, a typical network system, such as the Internet, cannot add an annotation to all the information, i.e., all the web contents, and the number of web contents that can be transcoded is limited. In order to reduce the workloads required to add an annotation, the above described method for correlating one annotation with multiple web contents has been proposed. However, for the method 1 whereby the correlation between URLs and annotations is stored as table data, it is not practical for the table content to be updated frequently in order to cope with new URLs that are generated day after day. Therefore, this method cannot be employed especially for a web page used for describing news articles or search results obtained by a search engine.

For the method 2 using the regular expression of URL, the author of an annotation must analyze the URL structure of a web site and describe a complicated regular expression, so a great deal of workloads are required. Further, this method cannot cope with web contents whose layouts are dynamically changed using cookie data. If the method using a regular expression of URL is employed together with an XPath wildcard designating a specific portion of an HTML document, the web content whose layout is to be changed dynamically can be coped with to some extent. In this case, overall, the URL structure of the web site is thoroughly analyzed, and a URL condition on which the same layout appears is determined. And if the web content cannot be handled by the regular expression, the XPath wildcard is employed to provide a wider use of the method for various purposes.

FIGS. 2A and 2B are schematic diagrams showing example layouts for a web page on which news articles are described. The layout in FIG. 2A differs from the layout in 2B in that a table "Top news" is inserted. The "Top news" table is arbitrarily added or deleted by a person acting as a web content manager. In this case, assume that a regular expression can be obtained for a URL that specifies the two web pages in common in FIGS. 2A and 2B, and that the XPath for the web pages is written as follows.

```
/html[1]/body[1]/table[7]/tbody[1]/tr[1]/td[3]/table[1]
```

If a wildcard is introduced in order to add or delete the "Top news", the XPath is written as follows.

```
/html[1]/body[1]/table[7]/tbody[1]/tr[1]/td[3]/table
    [starts-w ith(child::tbody[1]/tr[1]/td[1]/table[1]/
    tbody[1]/tr[1]/td[1], '■Top news')]
```

However, since these operations are so complicated and the description of the XPath also becomes complicated, a lot of workloads are imposed on the author of the annotation. Furthermore, although the method for employing the XPath wildcard to change the layout can cope with a simple change, such as the addition or deletion of a visually semantic block (a header, a footer, a link list, main text and an advertisement; hereinafter referred to as a group) that is an element or component of the web content and is represented by a certain layout (e.g. a background color), it is difficult to handle a major change affecting the entire layout.

Further, even for specific web contents at the same URL, the layout may be dynamically changed based on other web contents that have been passed through before the specific web contents are reached. Similarly, the layout may be dynamically changed by re-loading the web content using the same URL. In these cases, to add an annotation, using the regular expression of URL is not sufficient to handle them, and the XPath wildcard must be employed. However, when there is a major change in the layout, it is difficult for such change to be handled with by the XPath In addition, there are many web pages on which the results obtained by a search engine are displayed. The layout of such pages tends to be changed greatly, depending on whether a search target (a page, a product, a book, etc.) corresponding to a matched keyword is present or not. In this case it is also difficult to cope with the web pages by traditional way of using the regular expression of URL and the XPath.

Furthermore, in the method 3 for correlating one annotation with multiple web contents by employing the table structure of web contents to dynamically determine which annotation is to be used, the table used for specifying a layout is employed as criteria (references) for determination. Thus, an appropriate annotation cannot be determined when a table in a web content is not used for a layout purpose, or when a layout having the same form but different content is employed. If the determination criteria is more strictly applied in order to avoid an erroneous determination (e.g. different layouts are regarded as being the same), layouts that are basically the same may be judged to be different and an erroneous determination could not be avoided.

It is, therefore, one object of the present invention to correctly employ an annotation for multiple web contents and to thus efficiently reduce the workloads required for adding an annotation during the transcoding process.

It is another object of the present invention to provide a tool for simplifying the addition of an annotation to web content.

SUMMARY OF THE INVENTION

According to the present invention, a system is provided wherein, during the transcoding process, an appropriate annotation is selected from among annotations stored in an annotation database, so that the annotation can be correctly employed for multiple web contents.

To achieve this object, according to the present invention, a system for transcoding digital content is provided. The system comprises: a database system for storing annotations to be used in a transcoding process; and a transcoder for transcoding the digital content based on an annotation stored in the database. The database system selects the annotation based on correlation between elements in the digital content and descriptions of the annotations. The system descriptions of the annotations may include descriptions for specifying certain portions of digital contents, which is typically "XPath". If a plurality of annotations that can be applied to the digital content are found, the database system may select the annotation that includes the descriptions of as many elements in the digital contents as possible.

Furthermore, the present invention can be implemented by providing, for the web server, the function of the above described transcoding system. Specifically, a web server comprises: contents storage means for storing contents; annotation file storage means for storing annotations; transcoding means for employing correlation between the layout of elements of the contents and the descriptions of the annotations to obtain an annotation that can be employed for the contents to be processed, and for transcoding the contents; and transmission means for transmitting contents obtained by the transcoding.

According to the present invention, a method for transcoding digital content is also provided. This method comprises the steps of: obtaining the digital content; reading annotations to be used in a transcoding step from a database; determining an annotation corresponding to the digital content based on correlation between elements in the digital content and descriptions of the annotations; and transcoding the digital content based on the annotation determined at the determining step. The descriptions of the annotations may include descriptions for specifying certain portions of digital contents, which is typically "XPath". The invention can also be implemented by a program product executable on a computer for performing the above-mentioned method of transcoding the digital content. This program product can be distributed by being stored on a recording medium, such as a magnetic disk, an optical disk or a semiconductor memory, or by being transmitted across a network.

According to the present invention, annotation data stored in an annotation database system has the following structure. Annotation data is stored in annotation files that are prepared for units of contents, and includes descriptions for the transcoding process. This data is correlated with a layout of elements in the digital contents, typically using XPath. The annotation files are roughly sorted based on location information of the contents on a network, which is typically URLs (Uniform Resource Locators) that are schematically described. Further, the annotation data may include information for identifying an element (optional group) in the digital content for which a layout change is planned.

Furthermore, in order to simplify the process for adding an annotation to web contents, an annotation management apparatus or program product is provided that serves as a tool for the correlation with annotations. The apparatus or a program product for managing annotation data to be used for transcoding digital content performs the method comprising the steps of: evaluating a correlation between elements in the digital content and a description in the annotation data; and presenting a interface to show a state of the correlation between the digital content and the annotation data, based on evaluation results obtained by the evaluating step. The interface may provide, for each element of the digital content, a list for displaying whether the description of a corresponding annotation data is present. This interface also may provide a display component on which a detailed correlation between the description of the annotation data and the elements in the digital content is displayed. The interface further may provide a display component for accepting an entry from a user and interactively displaying a state of the annotation data corresponding to the digital content based on the entry. This interface may provide a display component for editing the annotation data.

BRIEF DESCRIPTION OF THE DRAWINGS

FIG. 1 (PRIOR ART) is a diagram for explaining an example of a system configuration that implements transcoding based on an annotation.

FIGS. 4A and 4B are diagrams showing an example of XML descriptions for an XPath that corresponds to an optional group used for the embodiment.

FIG. 5 is a flowchart for explaining an example of the processing performed by a transcoder.

FIG. 6 is a flowchart for explaining an example of the processing for an annotation database according to the embodiment.

FIG. 7 is a diagram for explaining an example of the functional arrangement of a site pattern analyzer used for the embodiment.

FIG. 8 is a diagram showing an example operating screen for the annotation management using the site pattern analyzer.

FIG. 9 is a flowchart for explaining an example of the semi-automatic correction processing performed when it is determined that multiple annotations can be applied for the same page.

FIG. 10 is a flowchart for explaining an example of the processing for adding an annotation to all web contents in a predetermined web site by using the site pattern analyzer.

DETAILED DESCRIPTION OF A PREFERRED EMBODIMENT OF THE INVENTION

The preferred embodiment of the present invention will now be described in detail, while referring to the accompanying drawings.

In order to accurately employ an annotation for multiple digital contents, such as web contents, the present invention implements a system wherein an appropriate annotation is selected from among annotations stored in an annotation database system, during a transcoding process. Further, in order to simplify the process by which an annotation is added to web contents, a site pattern analyzer is provided as an annotation management tool. An explanation will be given separately for the system that selects and uses an appropriate annotation at the time of transcoding, and the site pattern analyzer.

Figure 3:
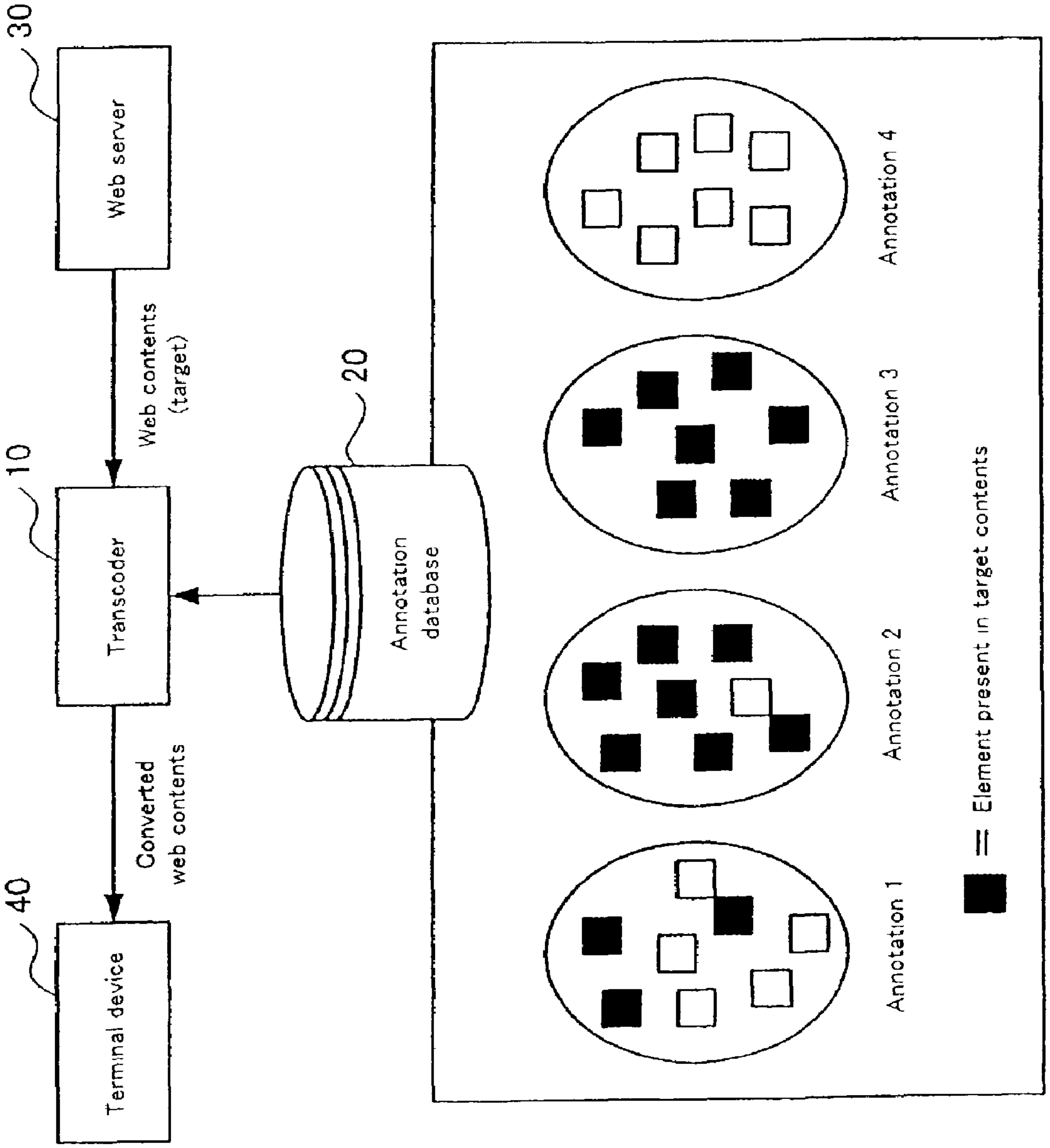
FIG. 3 is a diagram for explaining an example of a system configuration according to one embodiment of the invention that implements transcoding based on an annotation.

FIG. 3 is a diagram for explaining an example of a system configuration according to the embodiment that performs transcoding based on an annotation. In FIG. 3, the transcoding system comprises: a transcoder 10 for converting (transcoding) digital contents, such as web contents; and an annotation database system 20 in which an annotation file is stored to be used for the transcoding process. The transcoder 10 is located between a web server 30 for providing original web contents and a terminal device (web client) 40 for requesting the web contents from the web server 30. In accordance with the specifications and the environment for the terminal device 40, the transcoder 10 transcodes the web contents downloaded from the web server 30, and transmits the contents thus obtained to the terminal device 40.

In this arrangement, the web server 30 is, for example, a server machine that is implemented by a computer system, such as a workstation or a personal computer. The terminal device 40 can be a computer system, such as a workstation, a personal computer, or an information terminal, such as a PDA (Personal Digital Assistant) or a mobile telephone, and is connected to the web server 30 by a network.

The transcoder 10 is a module provided on the network that connects the web server 30 and the terminal device 40, and its functions are carried out by the CPU in a computer system, such as a workstation or a personal computer, that is controlled by a program. The transcoder 10 may be provided as an independent computer system that provides a service for transcoding web contents received from the web server 30, or may be an added function of a computer system that functions as the web server 30.

The annotation database system 20 is implemented by data recording means, such as a hard disk or a semiconductor memory, and a management system that manages the data recording means. The management system can be, for example, the CPU of a computer system, such as a workstation or a personal computer, that is controlled by a program. Above configuration itself is substantially the same as the conventional transcoding system.

In this embodiment, upon receiving an inquiry from the transcoder 10, i.e., during the transcoding of web contents, an annotation that can be applied to the web contents to be transcoded is selected from among the annotation files stored in the annotation database system 20. As a result, the transcoder 10 transcodes the web contents based on the annotation selected from among the annotation files in the annotation database system 20.

The annotation file is so selected from the annotation database 20 by determining whether the Xpath (description for specifying a certain portion or position of the content) in the pertinent annotation can be applied to the target web contents, i.e., whether the XPath correctly corresponds to a group or an element (a block having a visual meaning that is represented by a layout, such as a web contents background color, e.g., a header, a footer, a link list, a text, and an advertisement) in the web contents.

The annotation files in the annotation database system 20 are roughly sorted by the URLs of the web contents. That is, a schematic URL, e.g. the server name or the folder name of a site where the web contents to be processed are present, is correlated with each annotation file. To search for an annotation to be applied to the web contents to be processed, first, the URL of the web contents is employed as a search key, and all the annotations that are correlated with such URL are regarded as candidate annotations for the web contents to be processed. And from among these candidates, an appropriate annotation is selected based on the relationship between the above described group (element) in the web content and the XPath.

The system in this embodiment supports an optional group that is not related to the determination process performed to decide whether the annotation can be applied for web contents or not. Specifically, in the web contents, there is a group such that, even when it is dynamically moved, added or deleted, a change in its layout does not greatly affect the web contents. This optional group is, for example, an advertisement object, the location of which is changed at random each time the object is reloaded, or a photographic object in the web contents carrying the news article. When these groups are regarded as optional groups, whether the annotation can be applied or not can be appropriately determined, regardless of the presence/absence or the size of these optional groups, or a change in their locations.

The optional group can be set by adding "optional attribute" to the group using the XML description. For example, assume that, in predetermined web contents, the object for a banner advertisement is displayed on one of the following two Xpaths:

```
/html[1]/body[1]/table[7]/tbody[1]/tr[1]/td[3]/table[1]/
    tbody [1]/tr[2]/td[1]

/html[1]/body[1]/table[8]/tbody[1]/tr[1]/td[2]
```

In these cases, when the optional attribute is added to the two groups, the advertisement object can be set as an optional object, and can be excluded from a group for which a determination is to be made as to whether to apply an annotation. FIG. 4A shows an example of the XML description for the XPath in the first case, and FIG. 4B shows an example of the XML description for the XPath in the second case.

FIG. 5 is a flowchart for explaining an example operation of he transcoder 10. While referring to FIG. 3, the transcoder 10 accepts an HTTP request from the terminal device 40 (step 201), and downloads the requested web contents (target HTML) from the web server 30 (step 202). The transcoder 10 then converts the HTML of the obtained web contents into a DOM tree (step 203), and employs the DOM tree to issue an inquiry to the annotation database system 20 for an annotation that corresponds to the web contents (step 204).

When the transcoder 10 receives from the annotation database system 20 an annotation that corresponds to the web contents, the transcoder 10 first performs a required preprocess for the annotation (step 205). The example of the required preprocess is to exclude the optional group that does not correspond to the web contents. The transcoder 10 converts the DOM tree of the web contents based on the annotation for which the required preprocess has been completed, and initiates the transcoding operation (step 206). As a result, the objects can be rearranged for the web contents, or the web contents can be altered for synthesized voice output. Thereafter, the transcoder 10 converts the DOM tree into HTML (step 207), and transmits the transcoded web contents to the terminal device 40 that originally issued the HTTP request (step 208).

FIG. 6 is a flowchart for explaining an example operation of the annotation database system 20. The operation in the annotation database system 20 to which the transcoder 10 has forwarded an inquiry will now be described while referring to FIG. 6. When the inquiry from the transcoder 10 is accepted by the annotation database system 20 (step 301), the URL (Universal Resource Locators) of the web contents is employed as a key to search for an annotation having a matching resource (step 302). When an annotation having a matching URL is not present, an error message is returned to the transcoder 10 (steps 303 and 304). In this case, either the transcoding for the web contents is not performed, or available transcoding for which an annotation is not employed is performed.

If the only one annotation having a matching URL is found in the annotation database system 20, this annotation is transmitted to the transcoder 10 (steps 303, 305 and 311). If there are multiple annotations having the matching URL in the annotation database system 20, an annotation for which all the XPaths match the groups (elements) in the web contents is selected (steps 305 and 306). If the only one such annotation is selected in the annotation database system 20, this annotation is transmitted to the transcoder 10 (steps 307 and 311).

If multiple annotations are found in which there are matching XPaths in the annotation database system 20, the annotation whose number of matched groups (elements) is the greatest is selected and transmitted to the transcoder 10 (steps 307, 308, 309 and 311). If there are multiple such annotations in the annotation database system 20, the latest annotation is selected and transmitted to the transcoder 10 (steps 309, 310 and 311). Through this processing, an annotation corresponding to the inquiry issued by the transcoder 10 is elected and is used by the transcoder 10 for the transcoding.

As is shown in FIG. 6, if an annotation that matches web content is not present in the annotation database system 20, an error notification is issued to the transcoder 10. If a plurality of annotations match with the same web content, the annotation having the greatest number of matched groups (elements) in the web content, or the latest annotation is selected. In addition to the above described method, the conventional layout matching technique for determining the similarity between the layout of web contents and an assumed layout based on an annotation may be employed to determine the similarity between the layouts, and an annotation for which the assumed layout is the most similar may be employed first.

However, the above described states mean that there are non-matching annotations. This will occur not only when the addition of annotations for web contents is not satisfactory, but also when the layouts for the target web contents are changed after the system has been activated, or when web contents having new layouts are added. Therefore, it is preferable that, even after the system has been activated, the correlation between the web contents and the annotations be monitored and adjusted as needed.

As the method for implementing the invention, when a transcoding error has occurred because web contents do not match any annotations, there are web contents that match multiple annotations, or there are web contents that are transcoded while there is text information that is not designated by a group, notification of the occurrence of the transcoding error may be transmitted to the terminal device for annotation authoring to inform the author that this state exists (on-the-fly tests). Upon receiving this notification, the author may employ a tool such as a site pattern analyzer, which will be described later, or may employ an annotation editor to edit an annotation, so that the state wherein appropriate annotations are correlated with web contents is maintained.

As is described above, since a check is performed to determine whether the elements that correspond to all the XPaths included in an annotation are present in web contents to be transcoded, the appropriateness of the annotation is determined by the annotation database system 20. Thus, the layout of the web contents can be determined in real time, and an appropriate annotation can be selected. Further, since the layout of the web contents is directly determined, unlike the conventional technique according to which a table structure for the web contents is referred to when determining an annotation to be used, the annotation can be controlled to prevent an erroneous estimate such that different layouts are regarded as being the same, or such that like layouts are regarded as being different.

In the method for managing the annotation file in the annotation database system 20, a URL is employed as the first key when searching for a desired annotation, and thereafter, determination of an appropriate annotation depends on the layout of the web contents. That is, the annotation candidates to be used are roughly determined by referring to URLs, and thereafter, the annotation to be used is specified in accordance with the correlation between the actual layout of the web contents to be transcoded and the description of the annotation (i.e., the XPaths of the group and the annotation). Therefore, so long as the location of web contents can be roughly designated, any URL can be used as a search key and the regular expression of a restricted URL need not be designated.

The operation of adding annotations itself differs in no way from the conventional operation performed to add an annotation to web contents. Further, if there is no annotation available for use with predetermined web contents, instead of using an XPath wildcard to cope with this situation, all that is necessary is for another annotation to be input that can be used with the web contents. Therefore, the annotation addition process is simplified. And in addition, since an XPath wildcard need not be taken into account, the semi-automatic generation of an XPath can be easily performed using the annotation editor. As is described above, according to the embodiment, the addition and the adjustment of an annotation can be greatly simplified.

Figure 2B:
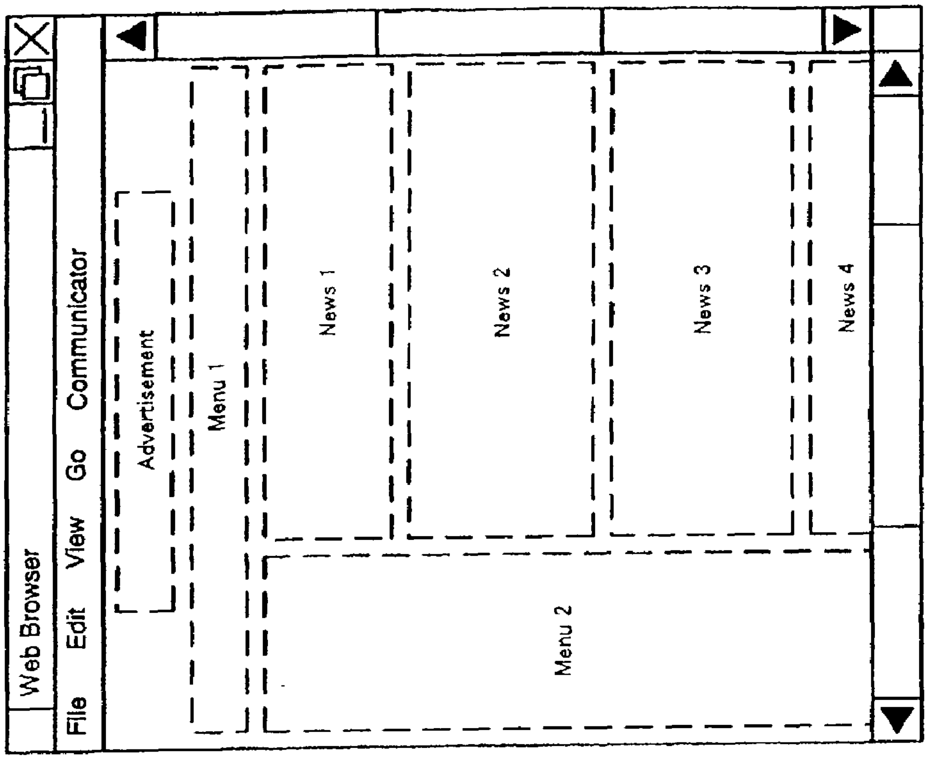
FIG. 2 is a schematic diagram showing an example layout for a web page that carries a news article.
Figure 2A:
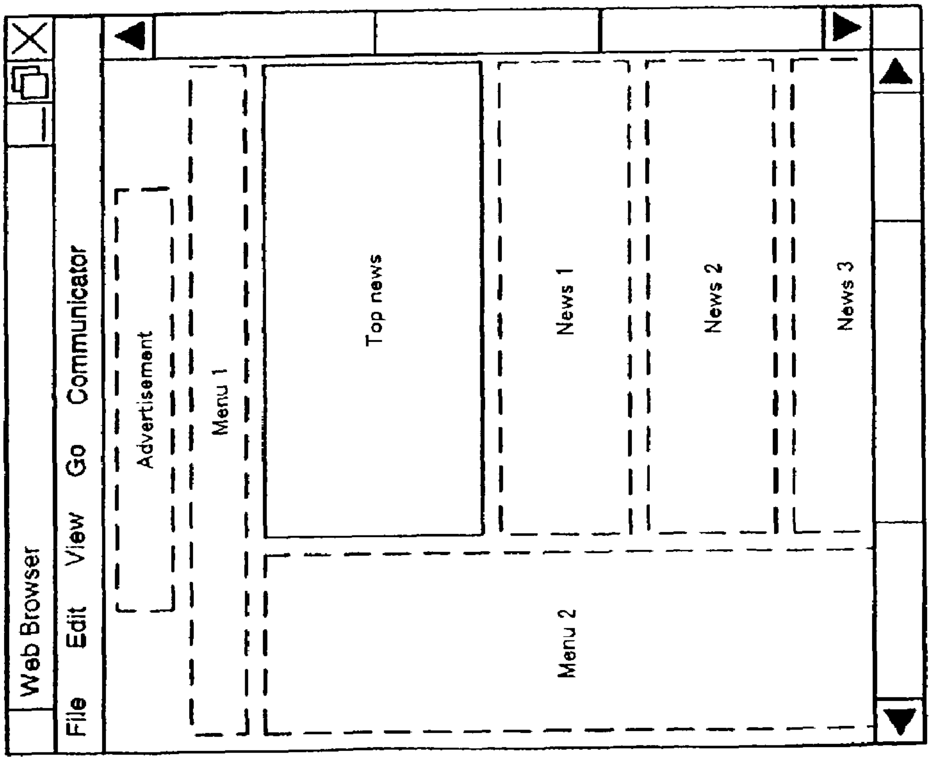

As is described above, according to the embodiment, the annotation is not generalized using an XPath wildcard, but instead, a necessary annotation is added to the layout of desired web contents. For example, when the "Top news" table in FIG. 2 is added or deleted, or when the layout of the web contents is changed, even with the same URL, an annotation is generated for the individual layouts. Thus, the number of annotation files required to transcode the same number of web contents is increased compared with the conventional method according to which annotations are generalized. However, an adjustment of regular expression of URL and an XPath, which are complicated operations for which maintenance is difficult, can be replaced by a simple operation of adding an available annotation to web contents for which there is no corresponding annotation. Thus, operating costs can be reduced, and maintenance can be simplified.

The transcoding system (the transcoder 10 and the annotation database system 20) in FIG. 3 for the embodiment is provided separately from the web server 30. However, in this embodiment, the function of the transcoding system may be provided for the web server 30. In this case, the web server 30 comprises: web content storage means for storing web contents; annotation file storage means that corresponds to the annotation database system 20; and web convent transcoding means that corresponds to the transcoder 10. Upon receiving a request from a web client, the web contents obtained by the transcoding means is transmitted via transmission means, such as a network interface.

Even when the transcoding system of this embodiment, including the annotation database system 20, is employed, as is described above, there still has occurred a problem in that it has been determined that multiple annotations can be applied for the same web contents, and a problem in that web contents are found that do not match any annotation. The first case is resolved, during the process performed to examine the annotation database 20, by selecting an annotation having the greatest number of matched groups, or by selecting the latest annotation. However, to the extent possible, it is preferable that a single annotation correspond to each set of web contents. In this embodiment, therefore, a tool, a site pattern analyzer, is provided that manages an annotation and supports the detection and resolution of the above problems.

The site pattern analyzer is software (a program) for displaying the tree structure of web contents in a desirable site, and for interactively presenting the state wherein an annotation is added. For example, to perform the annotation management for this embodiment, the site pattern analyzer may be installed in a computer that implements the transcoder 10 and the annotation database system 20, and that, as the annotation management apparatus, operates the CPU of the computer that performs the annotation management for this embodiment. When the site pattern analyzer is employed, the annotation author can confirm the annotation addition state while overviewing the desired site in its entirety, and can either add a new annotation or adjust the currently available annotation as needed. The site pattern analyzer, which is software, can be distributed by being stored on a storage medium, such as a magnetic disk, an optical disk or a semiconductor memory, or by being transmitted across a network.

Management software of this type has also been studied for the conventional transcoding system that employs the regular expression of URL and the XPath. However, the following problems remain, and it is difficult to design practical management software. First, since the unit of an annotation is a group and has a different URL regular expression, it is difficult to present a list of the existing correlations between the annotations and target web contents. Second, since the inter-group relationships in the web contents are complicated by the XPaths and the regular expression, total management of the groups is difficult. In the embodiment, to resolve the first problem, the annotations are managed by a unit of web contents (a set of groups/elements), so that the management of annotations can be visualized using a table. To simply solve the second problem, simply, the annotations will be managed by the unit of web contents, and for the web contents to which no annotation is added, a new annotation will be added.

FIG. 7 is a diagram for explaining an example of the functional arrangement of a site pattern analyzer. In FIG. 7, a site pattern analyzer 50 provided for this embodiment comprises: a matching evaluation module 51, a tree view controller 52, an annotation correction module 53, a matching character string extraction module 54, and a browser/DOM tree synchronization module 55. These components are software blocks the functions of which are performed by the CPU, which is controlled by the program in the computer in which the site pattern analyzer 50 is installed. Further, the site pattern analyzer 50 prepares an annotation table 56 and a matching table 57 in the main memory of the computer or in the cache memory of the CPU, and employs these tables for the processing.

At the time of activation or reloading, the thus arranged site pattern analyzer 50 travels across the entire site to be managed by an annotation, and employs input means (not shown), such as an interface, to cache the information for the web contents. At this time, the HTML file list concerning the web contents is also created. The site that is to be managed can be arbitrarily designated by an author. Further, in consonance with the same timing, the site pattern analyzer 50 employs input means (not shown), such as an interface, to read all the data for the annotation files from the annotation database 20, and stores the data in the annotation table 56.

The matching evaluation module 51 receives the HTML file of the web contents, which are cached as a processing target during the initial operation, and the HTML file list, and also receives the data for the annotation file (hereinafter referred to as annotation data) from the annotation table 56. Then, the matching evaluation module 51 calculates the matching of the XPath in the annotation and the web contents, and stores the calculation results (the evaluation results) in the matching table 57. The evaluation results stored in the matching table 57 are displayed as a list for viewing on the operating screen of the site pattern analyzer 50, which will be described later. When recalculation is required, e.g., when the site pattern analyzer 50 is activated or reloaded, the matching evaluation module 51 is called and performs the required processing.

The tree view controller 52 receives the HTML file for the web contents, which are cached as a processing target during the initial operation, and the HTML file list, and also receives the data for the annotation file from the annotation table 56. The tree view controller 52 then displays the tree for the annotations and the web contents for the entire site that is to be managed. The data output by the tree view controller 52 is displayed as a tree for viewing on the operating screen of the site pattern analyzer 50, which will be described later.

The annotation correction module 53 controls the changes in the annotation data stored in the annotation table 56 due to the property changes or the semi-automatic corrections. And the annotation correction module 53 controls the temporary caching of the annotation changes and the changes that are reflected by the actual annotations. The matching character string extraction module 54 reads, from the matching table 57, the evaluation results obtained by the matching evaluation module 51, and receives the DOM tree of the web contents that are cached as a processing target during the initial operation. The matching character string extraction module 54 then calculates a matching character string, so that the matching details of the XPaths in the annotations and the web contents are displayed using a character string, or so that an empty group, wherein there are no matched annotations, or omitted contents are displayed. The processing results obtained by the matching character string extraction module 54 are displayed as a detailed view on the operating screen of the site pattern analyzer 50, which will be described later.

The browser/DOM tree synchronization module 55 synchronizes a DOM tree consisting of predetermined web contents with the browser view of the predetermined web contents. And the data output by the browser/DOM tree synchronization module 55 are displayed as a browser view on the operating screen of the site pattern analyzer 50, which will be described later.

FIG. 8 is a diagram showing an example operating screen of the site pattern analyzer 50 for the annotation management. As is shown in FIG. 8, a tree view 61, a list view 62, a detailed view 63 and a browser view 64 are provided for an operating screen 60.

The tree view 61 is the output of the tree view controller 52 and indicates the annotations and the tree structure of the web contents for the entire site that is to be managed. When the author selects a desired directory in the tree view 61, the author can designate the directory that includes the web contents for which the author desires to confirm the annotation application state.

The list view 62 indicates, for the web contents included in the directory designated in the tree view 61, a list of the evaluation results that are obtained by the matching evaluation module 51 and that are stored in the matching table 57.

The list view 62 includes page titles 62*a* and URLs 62*b* for specifying web contents, the ID for specifying corresponding annotation 62*c* (annotation name), the number of annotations 62*d* that match the web contents, and correlations 62*e* (the presence or absence of corresponding elements) between the groups(elements) in the web contents and the descriptions in the annotations. With this list view 62, the author can determine for which web contents an annotation should be adjusted or a new one should be added, and can also identify a required operation. In addition, when the author selects desired web contents in the list view 62, the author can designate the web contents to be displayed in the detailed view 63.

In this embodiment, in the process for matching web contents and an annotation, even when there is an omitted annotation, an annotation that can be applied for the web contents may be determined, and the remaining contents may not be defined for transcoding (super set problem). To avoid this problem, an annotation omission indicator string and an empty group indicator string (62*f*) can be provided for each annotation in the list view 62 in FIG. 8. When the total number of characters in a text node, or the ALT attribute of an image, that is not included in an annotation for a group exceeds a predetermined number (designated by a user), the annotation omission indicator string is displayed as an alert indicating that there may be an omitted annotation. The empty group indicator string is displayed when the contents are not included in the group. Since these indicator strings are displayed, the author of the annotation can easily determine which annotation should be examined or corrected.

For these indicator strings, for example, the contents can be converted into a character string according to the following rules, and the content volume can be measured.

1. Use character string of the normal text node.
2. Use character string of the ATL attribute in case of an image.
3. Determine as a character string an image file name for an image having no ALT attribute. It should be noted that when an image file name, such as spacer.gif or lxlwhite.gif, is listed in advance for an image that can not be regarded as contents, this image file name is excluded.
4. When the number of input characters is obtained in advance by text-text area input, employ its dummy string (e.g., xxxxxx) as a character string. When the input character count is not known, employ a character string having an arbitrary number of characters.
5. Treat "input" of "image type" in the same manner as is an image.
6. When an embedded object is present, allocate an appropriate character string based on the size of the object occupied on the screen.
7. When the contents, such as JavaScript, are to be dynamically generated or moved, calculate a character string that does not exceed a predictable range.

The detailed view 63 is the output of the matching character string extraction module 54, and a detailed correlation between the contents (descriptions) of an annotation and an object (element) in web contents is displayed as a character string. With this detailed view 63, the author can determine whether the annotation can be correctly correlated with an appropriate object in the web contents.

In the browser view 64, the output of the browser/DOM tree synchronization module 55 is displayed via a browser component, and the operation using the tree view 61, the list view 62 and the detailed view 63 is reflected by the actual web contents. Thus, the author can perform the annotation management, while confirming how the transcoding based on the annotation is actually reflected by the web contents.

In addition to the main functions as explained while referring to FIG. 7, a function for semi-automatically adding a condition to the XPath, in accordance with a designation by an author, can be provided for the site pattern analyzer 50 in this embodiment as a function to cope with when multiple annotations can be applied for the same web page.

For example, among the XPaths for the Top news table in FIG. 2, the portion that can easily be generated by the annotation editor reaches the area up to the designation of a table.

/html[1]/body[1]/table[7]/tbody[1]/tr[1]/td[3]/table[1]

In this case, the annotation must be switched depending on whether the character string is "■Top news" or "■Memo". Therefore, the following condition must be added.

[starts-with(child::tbody[1]/tr[1]/td[1]/table[1]/tbody [1]/tr [1]/td[1], '■Top news')]"

For the common annotation editor that performs, as one operation unit, the addition of an annotation to one unit of web contents, it is difficult to add the above condition. However, since with the site pattern analyzer 50 multiple web contents can be browsed at the same time, a necessary condition can be added by a semi-automatic process.

FIG. 9 is a flowchart for explaining an example of the semi-automatic process. In FIG. 9, when the process is initiated, first, multiple web contents (e.g., 10 web contents) are displayed that it is determined match the same annotation (step 701). An author then refers to the detailed view 63 to select an example (a cell in a table) that designates an incorrect element (step 702), and inputs an "error group automatic correction" command (step 703). It should be noted that this command is for the same group. Then, candidates to be corrected are presented (step 704). These candidates are listed in accordance with the following conditions.

Examine whether a candidate can be identified by the first n characters of a character string in a group.

e.g.

/html[1]/body[1]/table[3]

→/html[1]/body[1]/table[3][starts-with(child::*, ‘old article’)]

Examine whether a candidate can be identified by the background color.

/html[1]/body[1]/table[3] [@bgcolor-‘CCCCCC’]

Search for a node that is included in either one.

/html[1]/body[1]/table[3] [child::tbody[1]/tr[2]/td[1]// img[1]

Thereafter, the author selects an appropriate candidate to be corrected (step 705). In addition to this candidate selection method, a method may be mounted for employing a wizard type to perform the process step by step.

An explanation will now be given for the processing during which the above described site pattern analyzer 50 is employed to add an annotation to all the web contents in the redetermined web site. FIG. 10 is a flowchart for explaining the processing. As is shown in FIG. 10, first, the entire desired web site is traversed and the web contents are obtained and cached (step 801). Then, the site pattern analyzer 50 or the annotation editor is employed to create an annotation for the cached web contents (step 802).

Then, the site pattern analyzer 50 analyzes the web contents cached at step S801 and the annotation created at step 802, and displays or outputs information concerning which annotation can be applied to which web contents in the web site (step 803). Subsequently, an annotation is added to the web contents to which it is determined, by the analysis, that an annotation has not been added (step 804). In the annotation addition process, the annotation editor may be employed to add a new annotation, or a predetermined group of conventional annotations may be established as an optional group to be applied for desired web contents. Further, when multiple web contents are detected for which the same annotation is to be applied, a group to which the annotation is erroneously applied is corrected (step 805). For this correction, the semi-automatic correction function explained while referring to FIG. 9 can be employed. Through the above processing, when one annotation can be correlated with each unit of all the web contents (or all the main web contents), the annotation file that is thus completed is uploaded to the transcoding system (step 806).

In the above example, it is assumed that the annotation editor that is provided separate from the site pattern analyzer 50 is employed for the creation of an annotation. However, the function of the annotation editor may be provided for the site pattern analyzer 50. In this case, when, as will be described later, the annotation omission is detected for each view that is the output of the site pattern analyzer 50, or when an annotation is to be added to the web contents to which no annotation has been added, the annotation editing function of the site pattern analyzer 50 can be employed to edit an annotation, without an annotation editor being required.

As is described above, according to the present invention, an annotation can be correctly employed for multiple web contents, and the workload required for the addition of an annotation due to the transcoding can be reduced considerably. According to the present invention, a tool can be provided for simplifying the operation for adding an annotation to web contents.

What is claimed is:

1. A computer-readable recording storage medium storing annotation data to be used in a transcoding process of digital content, the computer-readable recording storage medium comprising computer executable program code for:

reading said annotation data to be used in a transcoding operation, said annotation data is stored in annotation files that are prepared for units of digital contents, the annotation data including descriptions for the transcoding process, the descriptions being correlated with a layout of elements in the digital contents; and wherein said annotation files are sorted based on location information of the digital contents on a network;

selecting an annotation corresponding to the digital content based on correlation between a layout of the digital content and descriptions of the annotation data; and transcoding the digital content based on the selected annotation.

2. The computer-readable recording storage medium according to claim 1, wherein the descriptions in the annotation data are correlated with the layout of the elements in the digital contents by using XPath.

3. The computer-readable recording storage medium according to claim 1, wherein the annotation data include information for identifying an element in the digital content for which a layout change is planned.

4. The computer-readable recording storage medium according to claim 1, wherein said annotation files are sorted based on URLs (Uniform Resource Locators).

* * * * *